US006542692B1

(12) United States Patent
Houskeeper

(10) Patent No.: US 6,542,692 B1
(45) Date of Patent: Apr. 1, 2003

(54) NONLINEAR VIDEO EDITOR

(75) Inventor: Marshall Richard Houskeeper, Upton, MA (US)

(73) Assignee: Media 100 Inc., Marlboro, MA (US)

( * ) Notice: Subject to any disclaimer, the term of this patent is extended or adjusted under 35 U.S.C. 154(b) by 0 days.

(21) Appl. No.: 09/044,461

(22) Filed: Mar. 19, 1998

(51) Int. Cl.[7] .............................................. H04N 5/76
(52) U.S. Cl. ...................................... 386/52; 386/64
(58) Field of Search ............................. 386/4, 52, 53, 386/55, 64, 54; 345/328; 360/13, 15; 369/83, 84, 85; H04N 5/76, 5/92, 5/91, 9/79

(56) References Cited

U.S. PATENT DOCUMENTS

| | | | |
|---|---|---|---|
| 4,599,689 A | 7/1986 | Berman | 364/200 |
| 4,703,449 A | 10/1987 | Berman | 364/900 |
| 4,754,342 A | 6/1988 | Duffy | 360/14.3 |
| 4,916,531 A | 4/1990 | Genz | 358/75 |
| 4,970,663 A | 11/1990 | Bedell et al. | 364/521 |
| 4,974,178 A | 11/1990 | Izeki et al. | 364/523 |
| 5,051,845 A | 9/1991 | Gardner et al. | 360/14.1 |
| 5,111,203 A | 5/1992 | Calkins | 341/141 |
| 5,168,247 A | 12/1992 | Tarr | 331/111 |
| 5,185,883 A | 2/1993 | Ianni | 395/575 |
| 5,218,672 A | 6/1993 | Morgan et al. | 395/162 |
| 5,237,648 A | 8/1993 | Mills et al. | 395/133 |
| 5,243,513 A * | 9/1993 | Peters | 700/83 |
| 5,355,450 A | 10/1994 | Garmon et al. | 348/162 |
| 5,367,341 A | 11/1994 | Schnorf | 348/616 |
| 5,384,912 A | 1/1995 | Ogrinc et al. | 395/164 |
| 5,388,197 A * | 2/1995 | Rayner | 345/328 |
| 5,406,311 A | 4/1995 | Michelson | 345/200 |
| 5,469,270 A | 11/1995 | Yamamoto | 358/335 |
| 5,471,577 A | 11/1995 | Lightbody et al. | 395/157 |
| 5,488,695 A | 1/1996 | Cutter | 395/290 |
| 5,497,244 A | 3/1996 | Chargin, Jr. et al. | 358/335 |
| 5,506,932 A | 4/1996 | Holmes et al. | 395/2.14 |
| 5,559,641 A | 9/1996 | Kajimoto et al. | 360/14.1 |
| 5,568,275 A | 10/1996 | Norton et al. | 386/52 |
| 5,628,028 A | 5/1997 | Michelson | 395/828 |
| 5,640,320 A | 6/1997 | Jackson et al. | 364/192 |
| 5,664,216 A * | 9/1997 | Blumenau | 345/328 |
| 5,668,639 A | 9/1997 | Martin | 380/52 |
| 5,706,451 A | 1/1998 | Lightbody et al. | 395/327 |
| 5,748,842 A | 5/1998 | Holmes et al. | 395/2.79 |
| 5,760,767 A * | 6/1998 | Shore et al. | 345/328 |
| 5,877,781 A * | 3/1999 | Tomizawa et al. | 345/328 |
| 6,134,380 A * | 10/2000 | Kushizaki | 386/55 |
| 6,154,601 A * | 11/2000 | Yaegashi et al. | 386/52 |

FOREIGN PATENT DOCUMENTS

EP      0 015 054 A1 * 9/1980 ............. G06F/3/04

OTHER PUBLICATIONS

International Search Report, Jun. 14, 1999.

* cited by examiner

Primary Examiner—Thai Tran
(74) Attorney, Agent, or Firm—Fish & Richardson P.C.

(57) ABSTRACT

A method and a system are provided for playing back sequences of segments of video media data stored on a storage media. A segment of the video media data is retrieved at a predetermined period prior to playback and stored in a temporary storage. Control information correlated with the segment of the video media data is subsequently supplied for processing the segment of the video media data. The control information specifies the processing of the segment of the video media data during playback. The segment of the video media data is then processed according to the control information to generate processed video for playback.

58 Claims, 15 Drawing Sheets

NONLINEAR VIDEO EDITOR

BACKGROUND

This invention relates to editing video media data on computers.

In pc-based video editing systems, video media data is compressed and stored on disk. (Video media data includes video data, video and graphics data, audio and video data, or combinations thereof.) The user edits the video media data to form video programs which the user may then play back on a monitor or to a video tape recording machine. During play back, the user can change attributes of the processing applied to the video media data, e.g., audio levels, audio filter, video effects. However, there is typically a latency between the time the attributes are modified and the time the effects of modification appear in the video program being played back.

SUMMARY OF THE INVENTION

In one general aspect, the invention features playing back sequences of segments of video media data stored on a storage media. A segment of the video media data is retrieved at a predetermined period prior to playback and stored in a temporary storage. Control information correlated with the segment of the video media data is subsequently supplied, for processing the segment of the video media data. The control information specifies the processing of the segment of the video media data during playback. The segment of the video media data is then processed according to the control information to generate processed video for playback.

Embodiments of the invention may include one or more of these features.

The control information for the segment of the video media data is generated or modified during or after retrieving the segment of the video media data. A graphical user interface is displayed for a user to generate or modify the control information for the segment of the video media data during or after retrieving the segment of the video media data. The control information can also be modified or generated before the video media data is retrieved.

The video media segment may be a frame of video, a field of a frame of video, audio data (e.g a sample, a selected number of samples, or samples associated with a video frame), or graphics data.

A video effects operation may be applied to the video media data, where the video effects operation is selected from among a group of video effects operations including dissolves, wipes, and digital video effects, color effects, single or multiple overlays, and filters. The video effects operation may be characterized by an attribute selected from among a group of attributes comprising border width, range, reverse effect, crop, softness, transparency, and border color.

Similarly, an operation is performed on the audio, where the operation includes applying an audio filter. The audio filter can be selected from among a group of audio filters including equalization filter, audio compression filter, and sound effects filter. The operation also can be changing a playback volume of the audio or includes changing the pan balance between two channels. A characteristic of the processed media video data is monitored and the results of said monitoring is then displayed.

The storage media can be a digital database and retrieving the segment of the video media data can include accessing the digital database across a network. The storage media can also be one of a magnetic disk and a CD-ROM drive.

The processed video media data is played back and a subsampled image of the processed video is displayed when playing back the processed video media data.

A host computer retrieves the segment of the video media data and a peripheral board connected to the computer processes the segment of the video media data. Retrieving the segment of the video media data further includes sending at the predetermined time a request, from the peripheral board to the host computer, for the host computer to retrieve the segment of the video media data. Additionally, a list of segments of the video data to be played back is maintained. It is then determined which one of the segments of the video media data is to be played back at the predetermined time and a request is sent, from the peripheral board to the host computer, for the host computer to retrieve said one of the segments of the video media data.

Subsequent to retrieving the segment of the video media, the segment of the video media is scheduled, at the peripheral board, for playback. A request is then sent, from the peripheral board to the host computer, for the control information. The segment of the video media data may be processed at the host computer prior to processing the segment of the video media data at the peripheral board. Scheduling the segment of the video media data is accomplished by placing a pointer identifying the segment of the video media data on a segment playback queue.

Embodiments of the invention include one or more of the following advantages.

Embodiments of the invention allow for the delivery of control information to be delayed until the time it is required for playing back a frame. In other words, the control information is delivered "just in time" for the frame to be played back. This manner of just in time delivery of control information allows the user to modify the data until the last possible time before it is needed for playing back a frame. Viewed in another way, this manner of just in time delivery of control information reduces the latency between the user modifying the control information during play back and the user viewing or hearing the effects of that change on the video that is played back.

DESCRIPTION

Figure 1:
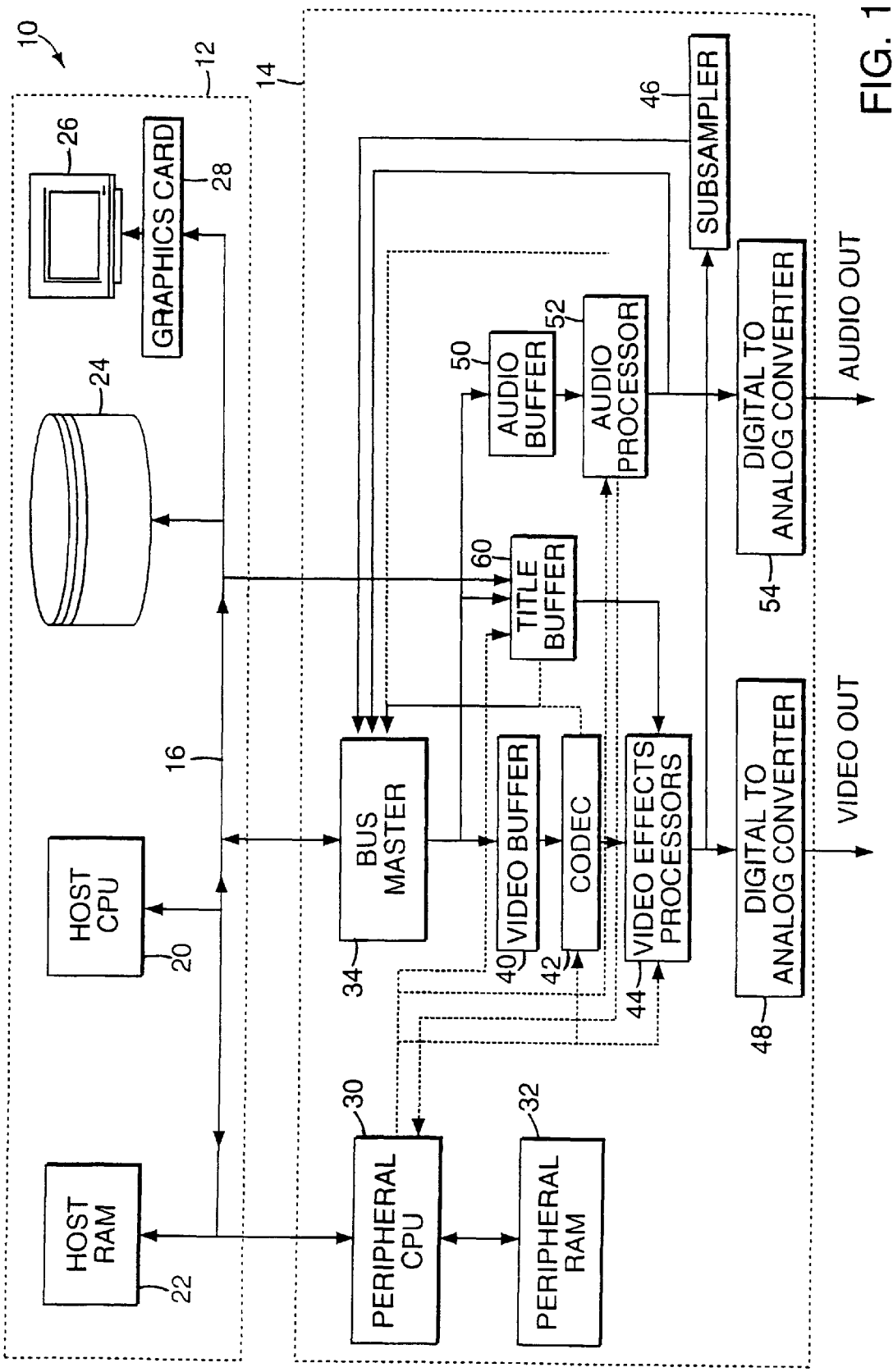
FIG. 1 shows a schematic block diagram of the structure of an example of a nonlinear video editor 10.

FIG. 1 shows a schematic block diagram of the structure of an example of a nonlinear video editor 10. Nonlinear video editor 10 allows a user to edit video media data to produce a video program assembled out of a number of audio clips (i.e., a sequence of samples of audio data) and video clips (i.e., a sequence of frames of video data). In the described embodiment, nonlinear video editor 10 supports up to two channels of video. Nonlinear video editor 10 also supports up to sixteen channels of audio. The sixteen audio channels are organized in pairs into eight audio tracks so that nonlinear video editor 10 can supports certain audio effects such as cross-fading from one audio channel to another. Nonlinear video editor 10 also supports a graphics channel for titles to be combined with the video data. In other embodiments, nonlinear video editor 10 may support greater or lesser numbers of audio, video, and graphics channels.

Nonlinear video editor 10 includes a host computer 12 and a peripheral board 14 connected to a bus 16 of host computer 12, for example, by being installed in a expansion slot of host computer 12. Host computer 12 has a central processing unit (CPU) 20, a random access memory (RAM) 22, a long-term data storage unit (e.g. magnetic disk drive or CD-ROM drive) 24, and a monitor 26 connected via a graphics card 28 to bus 16.

Data storage unit 24 stores compressed video media data. In other embodiments, data storage unit 24 may store noncompressed video data. Memory 22 stores a nonlinear video editing application 18 which is executed by host CPU 20 and is used by a user to edit the video media data to produce a final edited video program. Generally, nonlinear video editing application 18 produces a list of video clips, audio clips, and title files to be processed according to a set of instructions and then combined into the video program. The set of instruction may include control information for various types of processing such as video effects and audio filter.

In some embodiments, host computer 20 may be capable of connecting via a network to a remote digital database, searching that remote digital database for appropriate video media data, and using that video media data in producing the video program. Such a system is described in detail in the commonly assigned application of Suzanne M. Pietropaolo, Phillip T. DiBello and Anthony M. Scotto Jr., incorporated in its entirety by reference, "NONLINEAR VIDEO EDITING SYSTEM," filed on Mar. 9, 1998, and Ser. No. 09/037,310, now U.S. Pat. No. 6,351,765 B2.

Peripheral board 14 includes a peripheral board central processing unit (CPU) 30 and an associated peripheral board random access memory (RAM) 32. Peripheral board 14 also has a busmaster unit 34 which is responsible for retrieving video media data stored in memory 22 via bus 16. For playing back video data, peripheral board 14 has a video buffer 34 which temporarily stores the frames of video retrieved by busmaster 34. Video buffer 40 supports two video channels and may be implemented by a separate buffer for each video channel. A codec 42 decompresses the frames of video before transmitting the frames to video effects processor 44. Codec 42 supports two video channels and may be implemented by a separate codec chip for each video channel. A title buffer 60 temporarily stores title files which are retrieved by bus master unit 34 for being combined with the video data by video effects processor 44. Alternatively, title files may be written to title buffer 60 by host CPU 20. Video effects processor 44 applies video effects processing to the video data and title files, according to the control information received from nonlinear video editing application 18.

For playing back the associated audio, peripheral board 14 has an audio buffer 50 and an audio processor 52. Audio buffer 50 and audio processor 52 support sixteen channels of audio and may implemented by sixteen audio buffers and audio processors, respectively. Audio buffer 50 temporarily stores the audio data downloaded by busmaster unit 34. Audio processor 52 processes the audio data stored in audio buffer 50 according to the control information from nonlinear video editing application 18. Audio processor 52 also provides nonlinear video editing application 18, via peripheral CPU 30, with information with respect to the output of audio processor 52 after processing the audio data.

During playback, peripheral board 14 may output the final video program, for example, to a video tape recording machine (or an external monitor) and/or to monitor 26. In the case of playing back to a video tape recording machine or an external monitor, digital to analog convertor 48 converts the video digital data into analog video signals and digital to analog convertor 54 converts the audio digital data into analog audio signals in two stereo output audio channels. In other embodiments, more audio output channels may be supported. Additionally, in other embodiments, the digital audio and video data may also be outputted. In the case of playing back to monitor 26, peripheral board 14 uses a subsampler 46 to subsample the video images before sending them to busmaster unit 24 to send the subsampled video images to graphics card 28 of host computer 12.

Figure 2A:
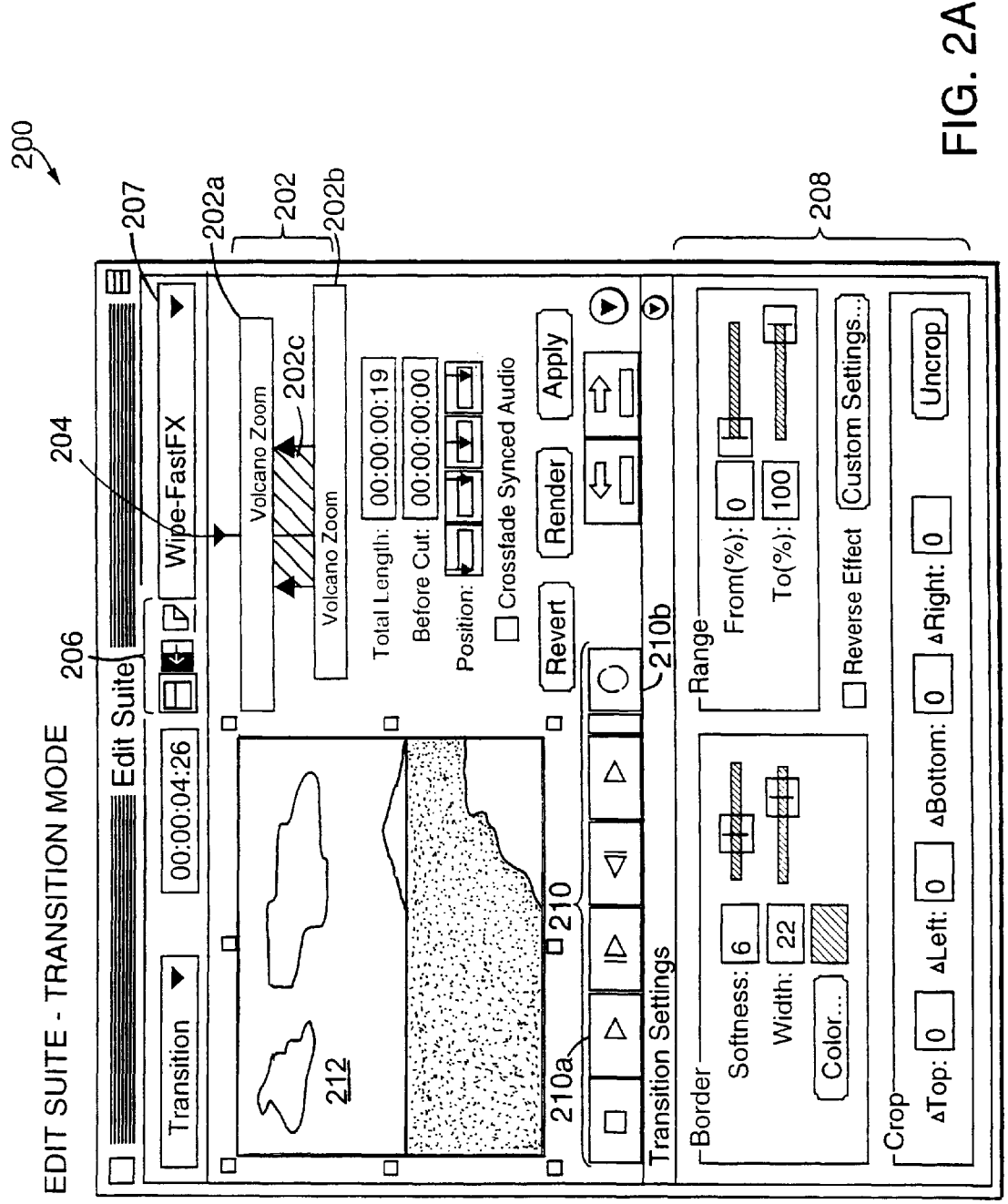
FIGS. 2A–2C show graphic user interface (GUI) windows associated with editing a video program.
Figure 2B:
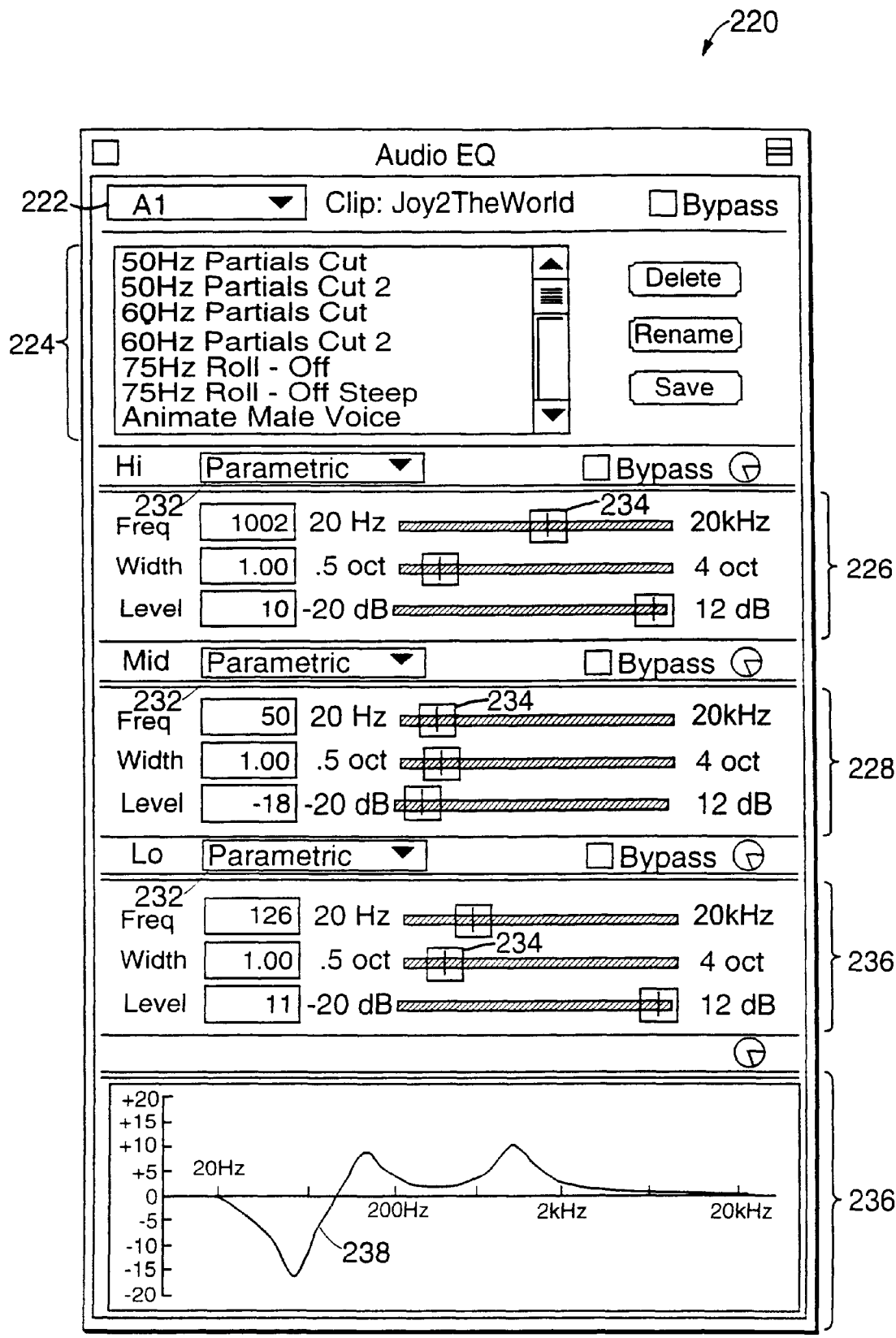
Figure 2C:
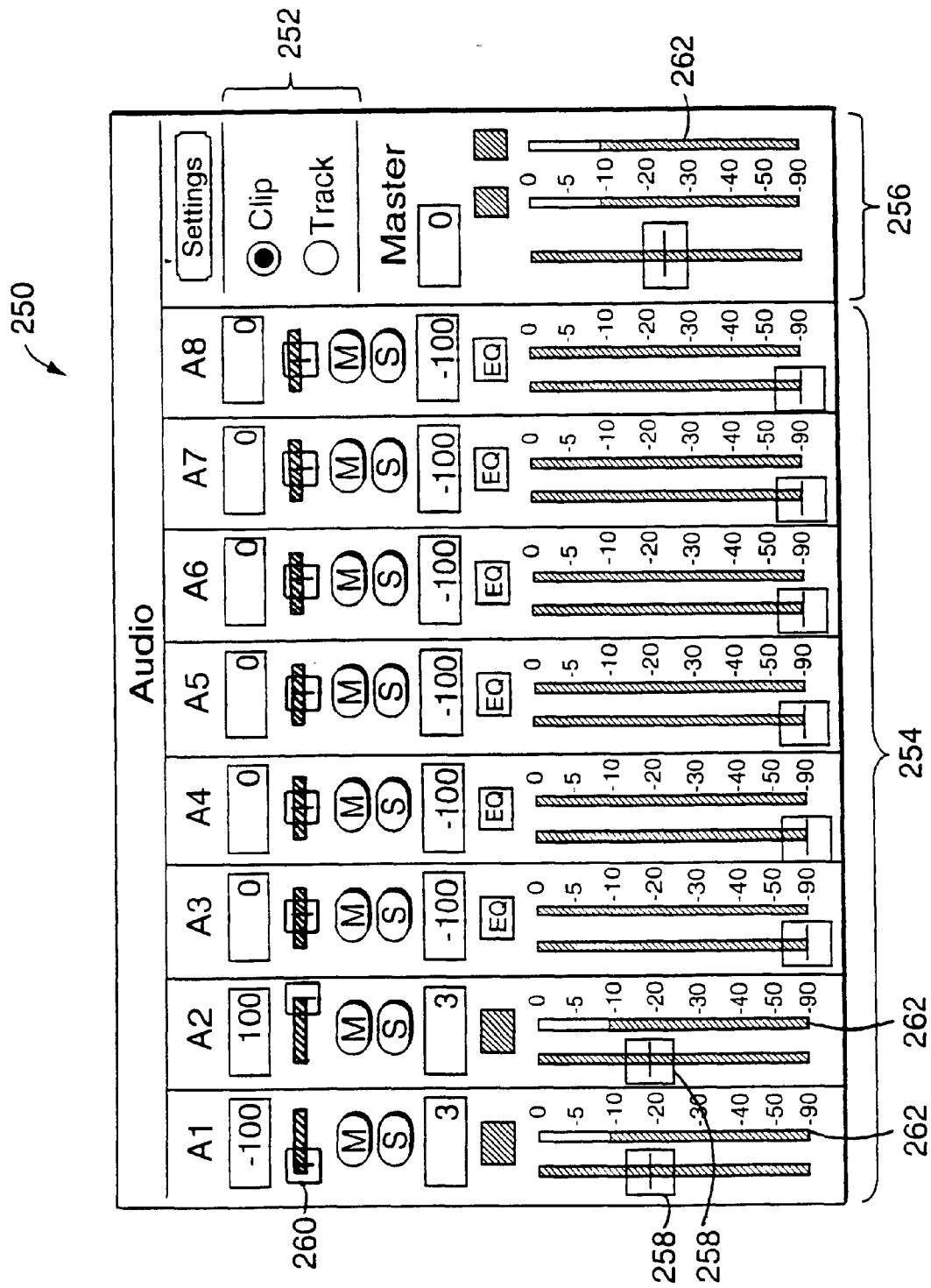

Referring to FIGS. 2A–2C, I will now describe how the user of nonlinear video editor 10 uses a variety of graphical user interface (GUI) windows to change control information used by video effects processor 44 (FIG. 1) and audio processor 52 (FIG. 1).

FIG. 2A shows a video editing graphic user interface (GUI) window 200 for editing a video clip or an entire video program. Video editing window 200 includes a time line region 202 where the time line of the video clip or program is shown. Time lines 202a and 202b show the video time lines of each of the two channels of video supported by nonlinear video editor 10. Effects time line 202c shows the time line of any video effects to be applied to the channels of video. If applicable, a similar time line may also be shown for a title file. Current time marker 204 indicates to the user the point in the time line of the video clip or program which is being currently played back and also shown in video program monitor region 212. During operation, the user may select to play back a video clip or program by clicking on a play button 210a in the play back control region 210. The user may also select to have a program or a clip played repeatedly by clicking on a repeat button 210b. (Note that, as is well known in the arts, various features of a GUI window may be "clicked on", i.e. pointed to by a graphic pointer guided by a pointing device such as a mouse and then selected by the user pressing a button of the pointing device. The features that may be clicked on to be manipulated include pull-down menus, buttons, scroll bars, etc.)

The user may select a video effect to be applied to the video clip or program by clicking on one of the video effects buttons in the video effects selector region 206. In FIG. 2A, video effects selection region 206 features three buttons corresponding to three video effects: dissolves, wipes, and digital video effects. Other video effects can, for example, include color effects, single or multiple overlays, filters, and so on. The user can use a video effect subcategory pull-down menu 207 to select a subcategory of a video effect he or she has selected. Each video effect is associated with a set of attributes which the user can modify to achieve desired results. The user may adjust the various attributes a particular selected video effect in video effects attribute adjustment region 208. Attributes may include border width, range, reverse effect, crop, softness, transparency, border color, and so on.

Nonlinear video editing application 18 converts the user input into control information which host CPU 20 or video effects processor 44 use to apply video effects processing to the video data. The user can change the video effects attributes or select different video effects as video clip or program is played back in real time. Nonlinear video editor 10 applies these changes in real time to video media data as the video program or clip is played back, as will be described in detail below.

FIG. 2B shows an audio equalization graphical user interface (GUI) window 220 for changing or setting the parameters of an equalization filter to be applied to audio tracks associated with a video clip or program. Audio equalization window 220 includes an audio track selector pull-down menu 222. In a preset audio filter region 224, audio equalization window features a list of preset audio filters each having preset attribute values. The current audio clip being played back is highlighted. Audio equalization window 220 further includes three control regions for each of the low, medium, and high frequency spectrums of the selected audio track (regions 226, 228, 230). In each of these regions, a filter selection pull-down menu 232 allows the user to select a particular type of filter to be applied to the corresponding frequency spectrum. The types of filters include, for example, parametric, high pass, low pass, high shelf, low shelf, notch, noise, and hum filters. The types of filter may include any other kind of filter such as audio compression or sound effects type filters (e.g. reverb). Regions 226, 228, 230 also display the parameters for the corresponding filters. Regions 226, 228, 230 also include control sliders 234 which the user can click on and move to change the values of the various filter parameters. Audio equalization window 220 also features an audio equalization graph 236 which graphically demonstrates the filter that is applied during playback. In other embodiments, audio equalization window 220 may include a display of real time analysis (e.g. frequency spectrum analysis) of the audio after applying the filter. Audio processor 52 monitors and analyzes the output audio and supplies the appropriate data to video editing application 18.

FIG. 2B shows an audio volume control graphical user interface (GUI) window 250 for changing or setting the volume for the audio tracks associated with a video clip or program. Audio volume control window 250 features a track/clip selector region 252 where the user can select between changing the volume for a particular video clip or for a particular audio track. Audio volume control window 250 includes a master volume region 256 and a track volume region 254. In master volume region 256, the user can change the volume for all of the tracks by clicking on and moving volume control slider 262. In track volume region 254, the user can change the volume for a particular track by clicking on and moving a volume control slider 258 associated with that track. Additionally, the user can change the balance of a track between the two output channels by clicking and moving a pan balance control slider 260. As with video effects parameters, the user can change the parameters associated with the audio tracks in windows 220 and 250 in real time as the video clip or video program is played back. Nonlinear video editor 10 applies the changes input by the user in real time to the video media data as the video program or video clip is played back, as will be described in detail below. Audio volume control window 250 also include volume level indicators 262 for each track and for the master volume. These indicators indicate the volume of audio outputted by peripheral board 14 based on data provided by peripheral board 14 in real time.

Having described how the user modifies the control information associated with the video media data as the video media data is played back, I will now describe how these control information are applied to the video media data in real time. It should be noted that, in the described embodiment, a frame of a program that is played back may be a composition of up to two channels of video, up to sixteen channels of audio, and a channel of graphics (i.e. title files). In order the simplify the description below, I will use the term "a frame to be played back" to refer to a frame of the final video program, which may be a composition of many channels of audio and video. I will use the term "associated audio and video data" to refer to the data in the video, audio, and title channels which, after processing, will be formed into the frame to be played back.

Prior to describing the process of video media data play back in detail, I will first provide a brief overview. Generally, the peripheral board at a predetermined time (in the described embodiment, 2 seconds) before a frame of video is to be played back, sends a request to nonlinear video editor application 18. Nonlinear video editing application in response loads the associated audio, video, and title data for the frame to be played back into host memory 22. The loaded video data may be a frame of video. Host CPU 20 stores in memory 22 in two data packets memory addresses of the audio and video portions of the loaded data. Host CPU 20 provides the peripheral board CPU 30 with address pointers to these data packets. Peripheral board CPU 30 stores these pointers, together with a pointer to any title data, in a frame cache link list 300 (FIG. 3A) in peripheral board memory 32 as will be described below.

Figure 4A:
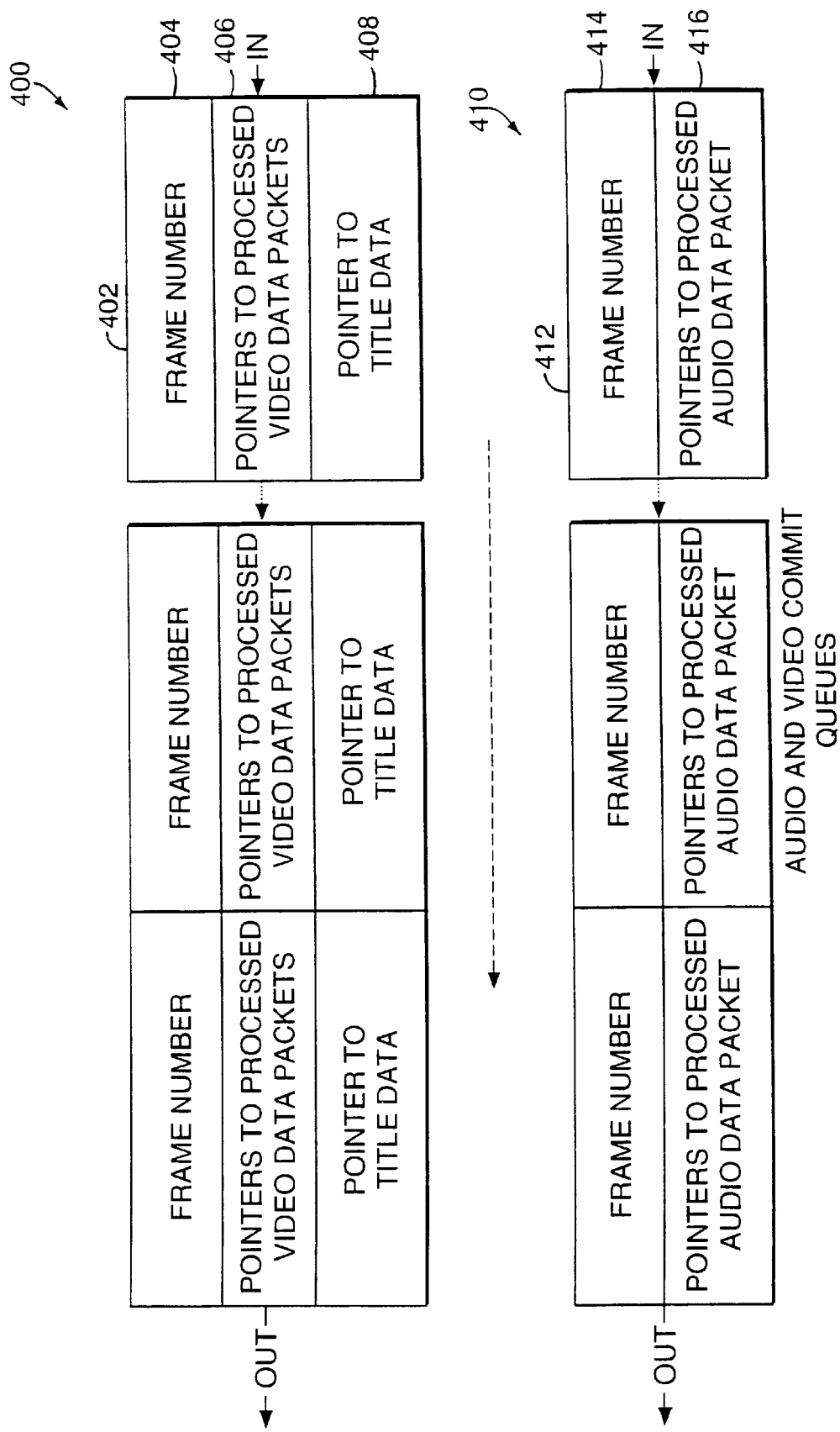
FIG. 4A illustrates the data structure of audio and video commit queues.
Figure 4B:
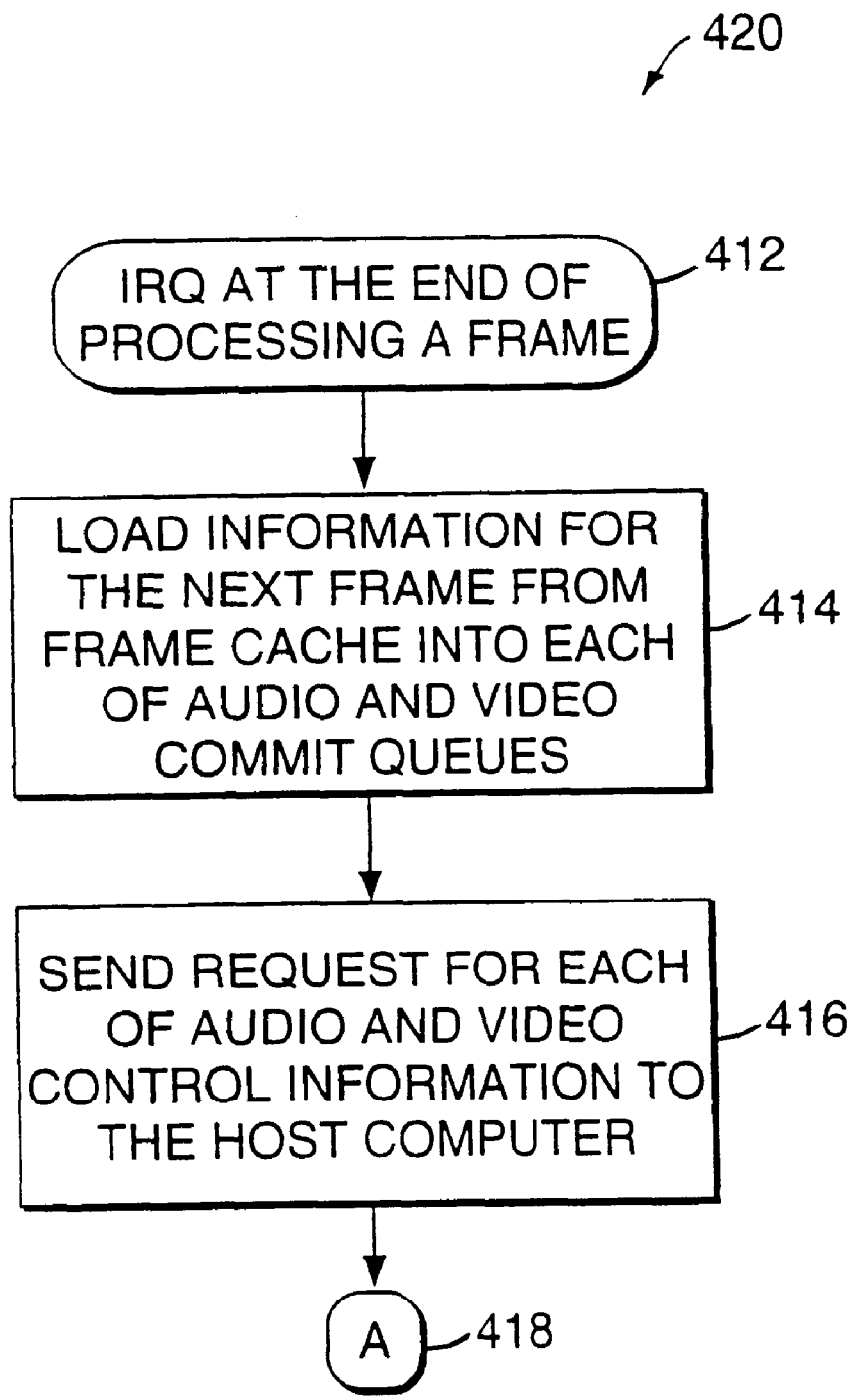
FIGS. 4B–4D are flow charts of processes associated with the audio and video commit queues.

Peripheral board CPU 32 also maintains a video commit queue and an audio commit queue (FIG. 4A). Each commit queue is implemented as a first-in-first-out (FIFO) queue. Each queue includes a predetermined number of queue elements where each queue element includes addresses to processed data packets containing memory addresses of the segments of video media data stored in memory 22 for a frame to be played back. The processed data packets also contain the control information for the stored video media data. When peripheral board 14 finishes playing back a particular frame, peripheral board CPU 30 takes the next queue elements from the commit queues and begins the process by playing back the frame. At this point, CPU 30 also takes the next element from frame cache link list 300, places it on the commit queues, and sends a request to nonlinear video editing application 18 for the appropriate control information. Nonlinear video editing application 18 supplies the control information for the video media data for the frame associated with the frame cache element just in time before the frame's queue elements reach the head of the commit queues. As it is readily apparent, nonlinear video editor 10 in this manner allows a user to continue modifying the control information for a segment after the segment is loaded into memory 22 and until shortly before the segment is played back. Therefore, the user can view or hear the results of modifying video effects controls or the audio controls substantially simultaneously as when he or she modifies those controls.

Figure 3A:
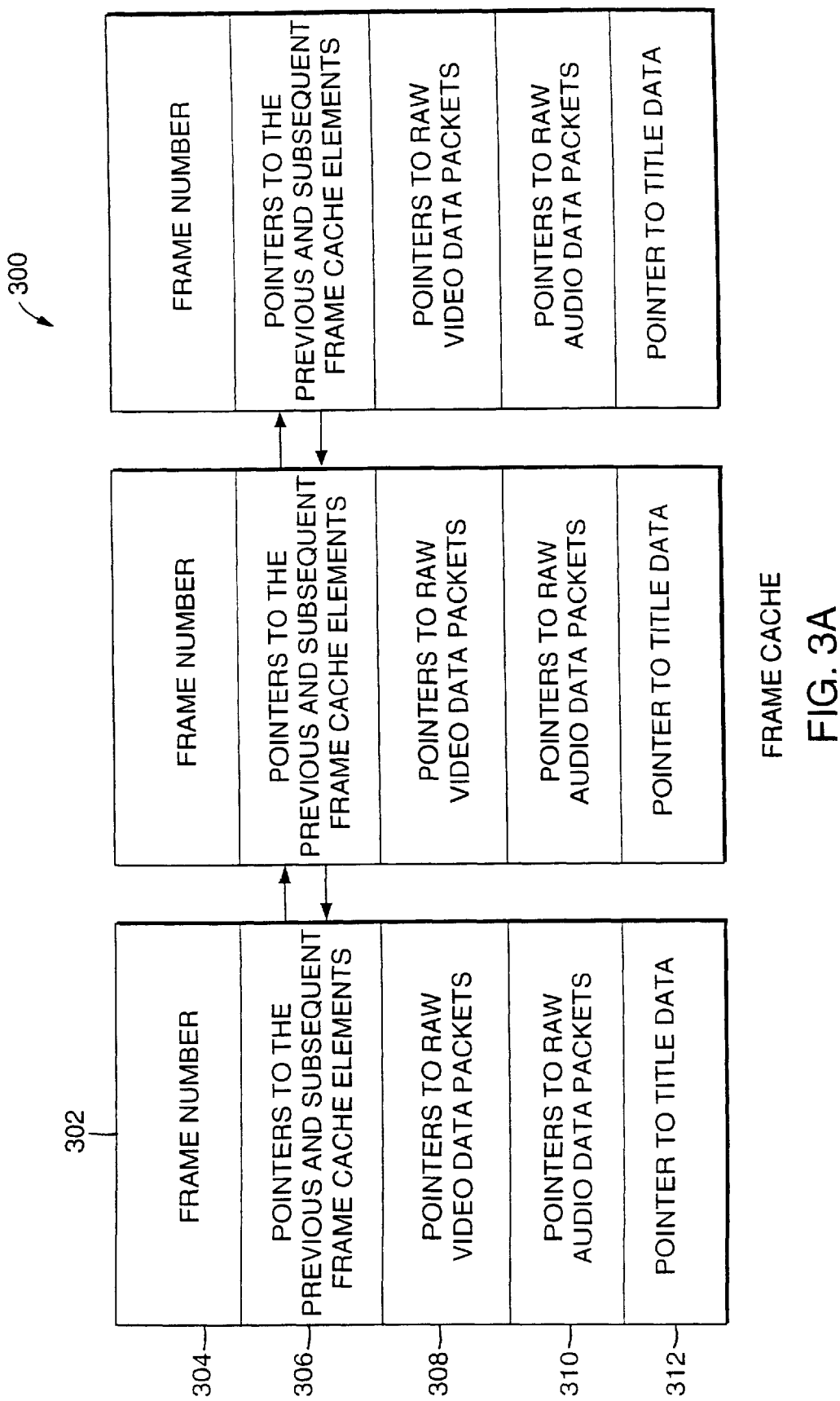
FIG. 3A illustrates the data structure of a frame cache link list.

I will now describe the above process in detail. Referring to FIG. 3A, frame cache link list 300 is a linked list of a number of frame cache elements 302. Each element corresponds to a frame to be played back and contains at least five types of information. Frame number 304 is a sequential number assigned to the frame. Pointers 306 contain the memory address of the previous and subsequent frame cache elements. Pointers 308 contain the memory address of raw video packets for the frame to be played back. Generally, raw video data packets contain the address of the video data (i.e. frames of video in the two channels of video) associated with a frame to be played back. As host CPU 20 loads each frame of video from storage unit 24 into memory 22, host CPU 20 stores the address of the location of the video frame in an appropriate raw video data packet. Pointers 310 similarly contain addresses of raw audio packets on the host memory 22. Each raw audio data packet points to loaded audio data associated with a single frame to be played. Each raw audio data packet can contain pointers for up to sixteen channels of associated raw audio packets. Pointer 312 contains the address of any title data on host memory 22 for the frame to be played back. Alternatively, pointer 312 may contain a unique identifier for a title file. In response to a request from peripheral board CPU 30, host CPU 20 then can use that unique identifier to identify the title file and directly load the appropriate title data into title buffer 60.

Figure 3B:
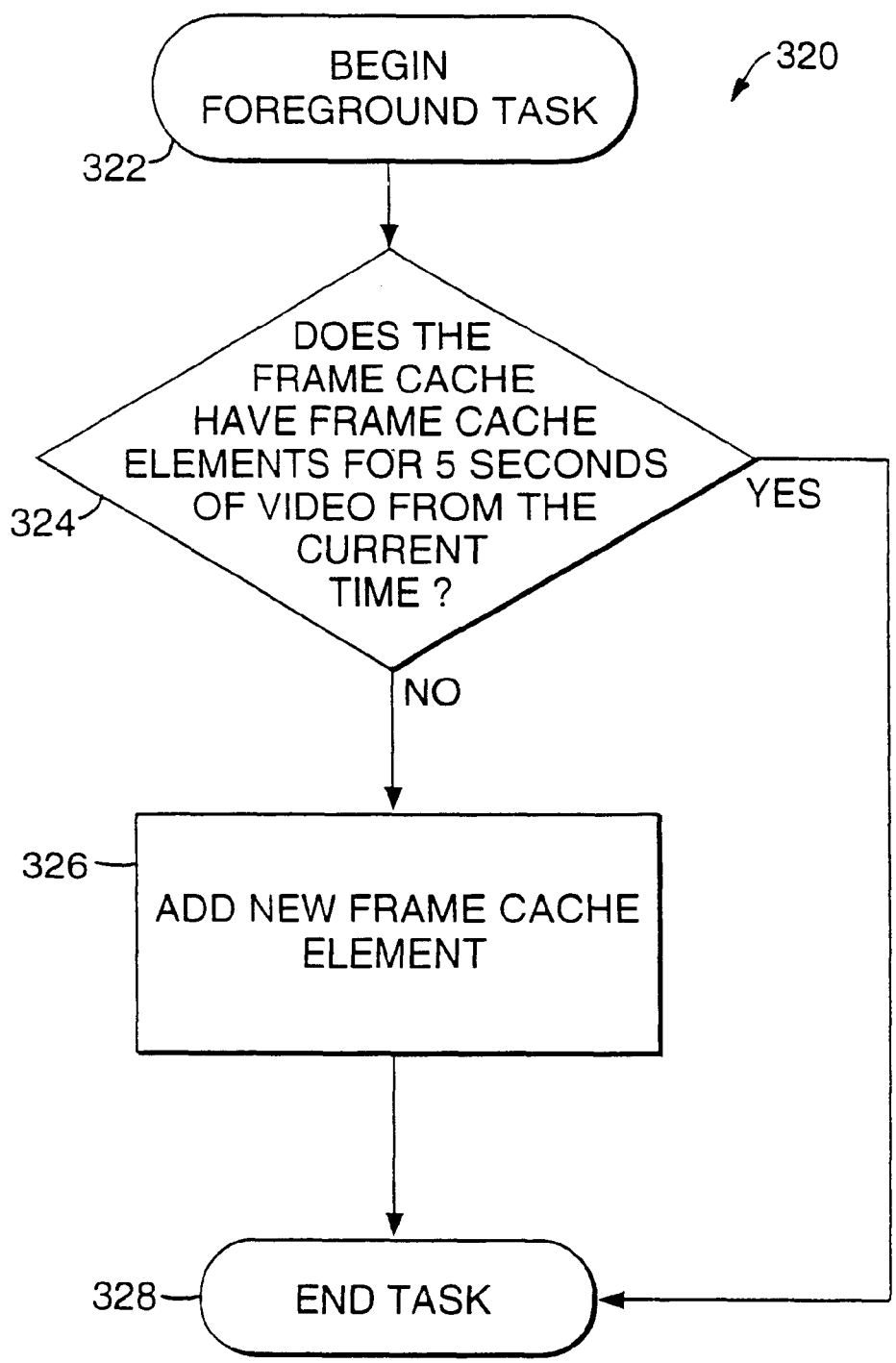
FIGS. 3B–3F are flow charts of processes associated with the frame cache link list.

FIG. 3B is a flow chart 300 of a foreground task executed by peripheral board CPU 30 to create new frame cache elements. A foreground task may be defined as a task that peripheral board CPU 30 executes repeatedly according to a scheduling policy. For example, in the described embodiment, peripheral board CPU 30 maintains a circular list of foreground tasks. Each time peripheral board CPU 30 becomes idle from a higher priority program, peripheral board CPU 30 executes the next task in the list. Therefore, in step 322, peripheral board CPU 30 begins executing the task. Peripheral board CPU 30 then determines if the frame cache link list 300 has a sufficient number of frame cache elements for the next five seconds of video program to be played back (step 324). If the frame cache link list 300 has enough number of elements, peripheral board CPU 30 ends executing the task (step 328). If the frame cache link list 300 does not have a sufficient number of elements, peripheral board CPU creates a new frame cache element 302 and adds it to the frame cache link list 300 (step 326). To create a new frame cache element 302, peripheral board CPU 30 increments a frame number counter and assigns its value as the frame number 304 of the new frame cache element. All other segments of the new frame cache element 302 are left empty. Peripheral CPU 30 also appropriately updates pointers 306 of the last frame cache element 302 and of the new frame cache element 302.

Figure 3C:
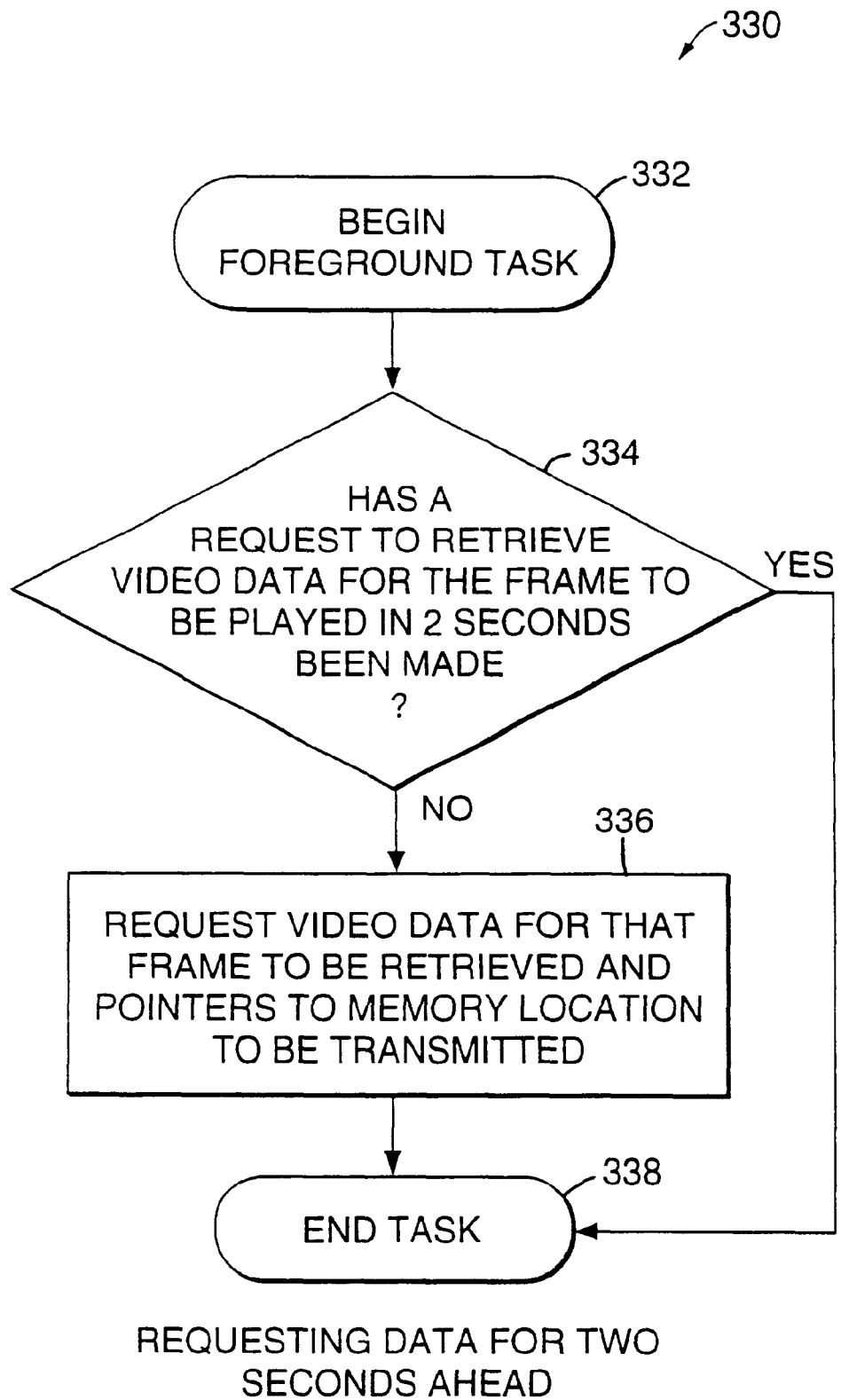

FIG. 3C is a flow chart 330 of another foreground task executed by peripheral board CPU 30. In this foreground task, peripheral processor sends a request to nonlinear video editing application for loading the video data for a frame to be played at a predetermined time in the future. After peripheral board processor 30 begins executing the foreground task (step 332), peripheral board processor 30 determines whether a request has been made to retrieve the video data associated with the frame to be played in two seconds (step 334). The period of two seconds is the outer limit of the time it takes in the described embodiment to load two video frames (one for each channel) from storage unit 24 into host memory 22. The value of this parameter depends on a particular embodiment's specifications and therefore varies embodiment to embodiment.

If peripheral board CPU 30 determines that a request has been made to retrieve the video data associated with the frame to be played in two seconds, peripheral board CPU 30 ends executing the foreground task (step 338). If peripheral board CPU 30 determines that a request has not been made to retrieve the video media data associated with the frame to be played in two seconds, peripheral board CPU 30 sends a request to the nonlinear editing application 18 to begin loading the video data for the frame to be played back in two seconds and to send the raw video packets pointers for the loaded data. Peripheral board CPU 30 also sends the frame number of the next available frame cache element. This frame number will be used by peripheral board CPU 30 and host CPU 20 to identify the frame for which data will be loaded.

Figure 3D:
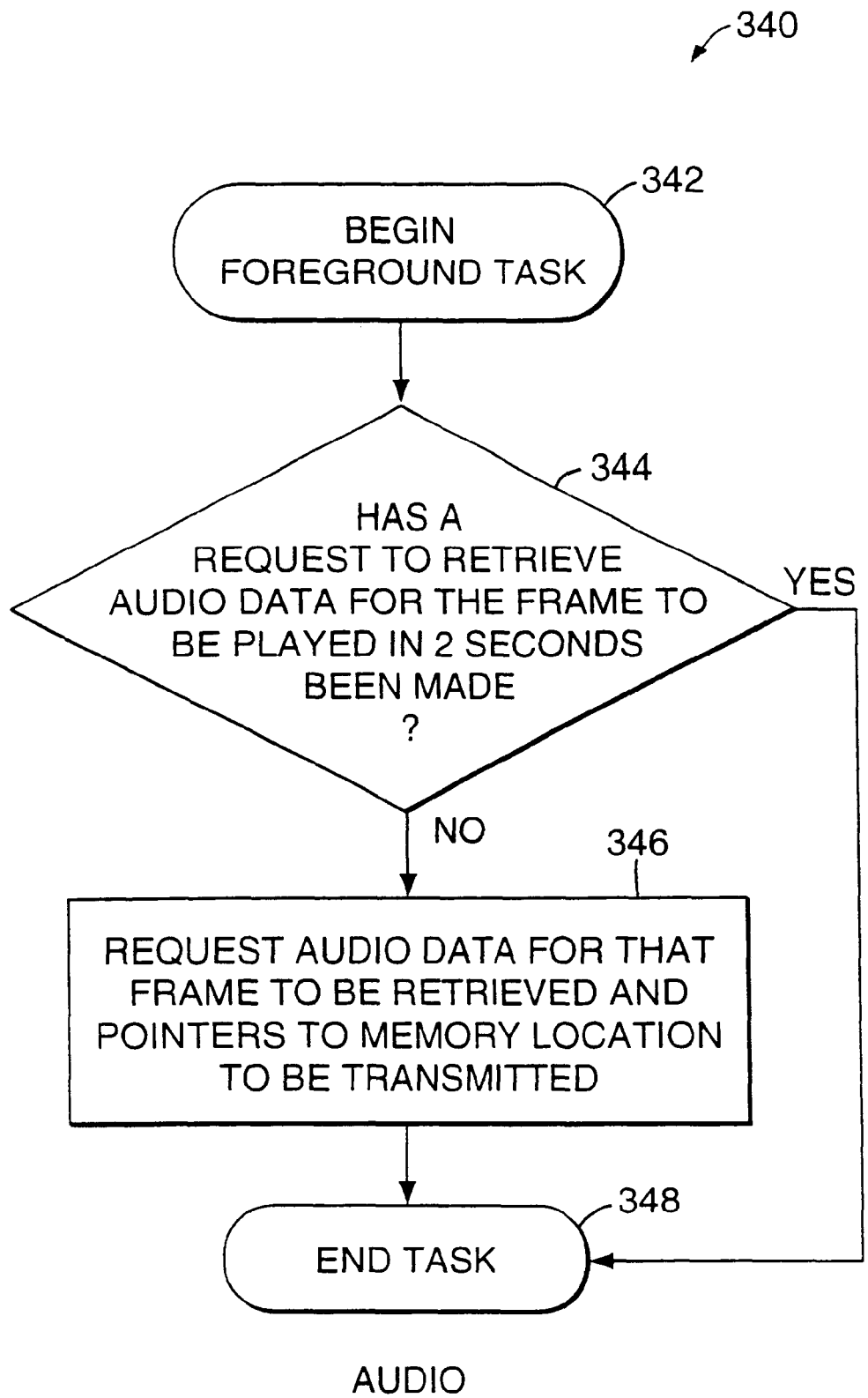

FIG. 3D is a flow chart 340 of a foreground task, similar to the foreground task in FIG. 3C, for requesting audio data for a frame to be played to be loaded from storage 24 to host memory 22. Steps 342–344 are the same as steps 332–334 described in reference to FIG. 3C, except that the request to load is made regarding audio data. It should be noted that in step 344, the period of two seconds is the outer limit of the time it takes in the described embodiment to load from storage unit 24 into host memory 22 sixteen channels of audio data for a frame to be played. The value of this parameter depends on a particular embodiment's specifications and therefore varies from embodiment to embodiment.

Figure 3E:
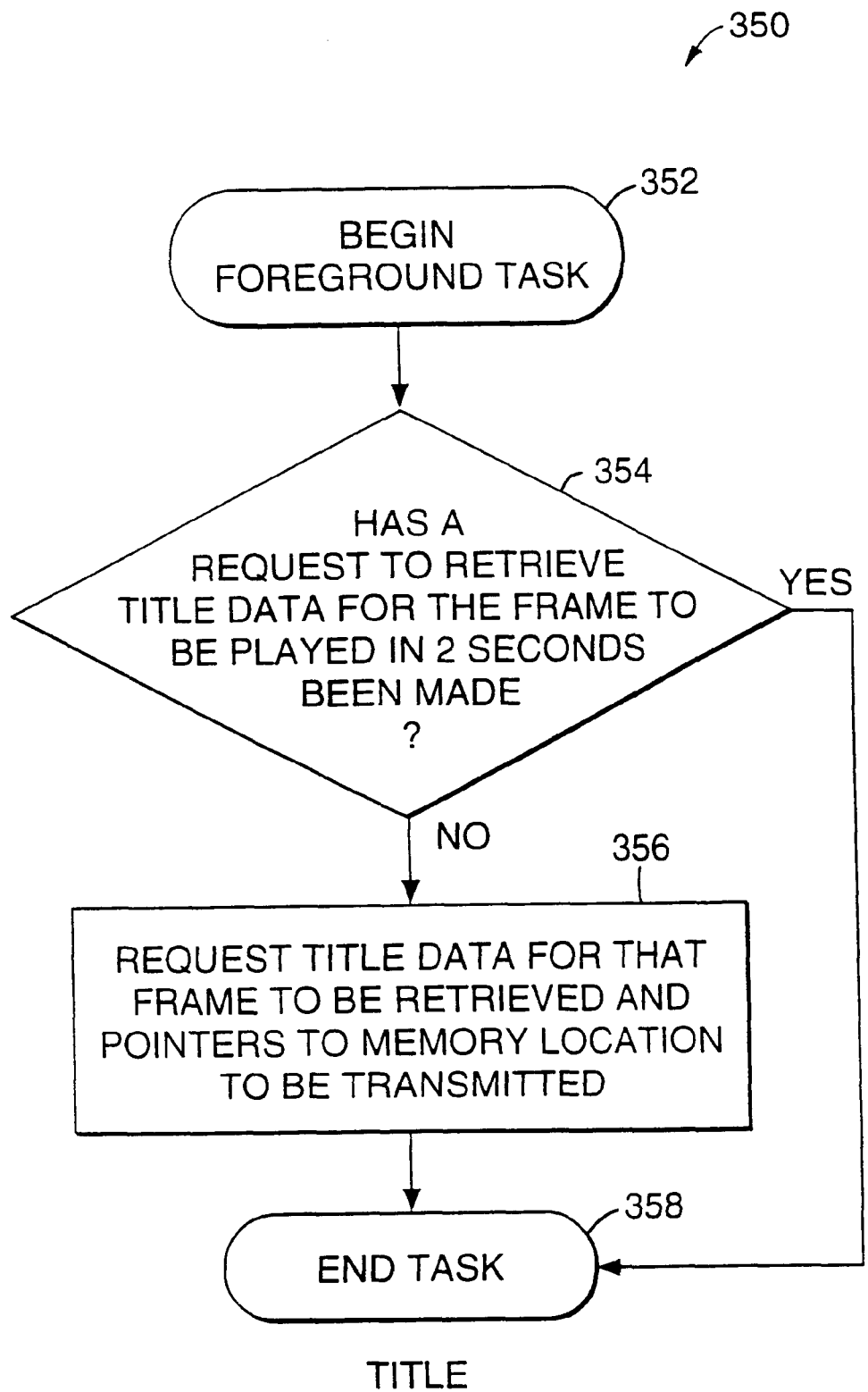

FIG. 3E is a flow chart 350 of a foreground task, similar to the foreground task in FIG. 3C, for requesting title data for a frame to be played to be loaded from storage 24 to host memory 22. Steps 352–354 are the same as steps 332–334 described in reference to FIG. 3C, except that the request to load is made regarding title data. It should be noted that in step 354, the period of five seconds is the outer limit of the time it takes in the described embodiment to load from storage unit 24 into host memory 22 title data for a frame to be played. The value of this parameter depends on a particular embodiment specifications and therefore varies embodiment to embodiment.

Figure 3F:
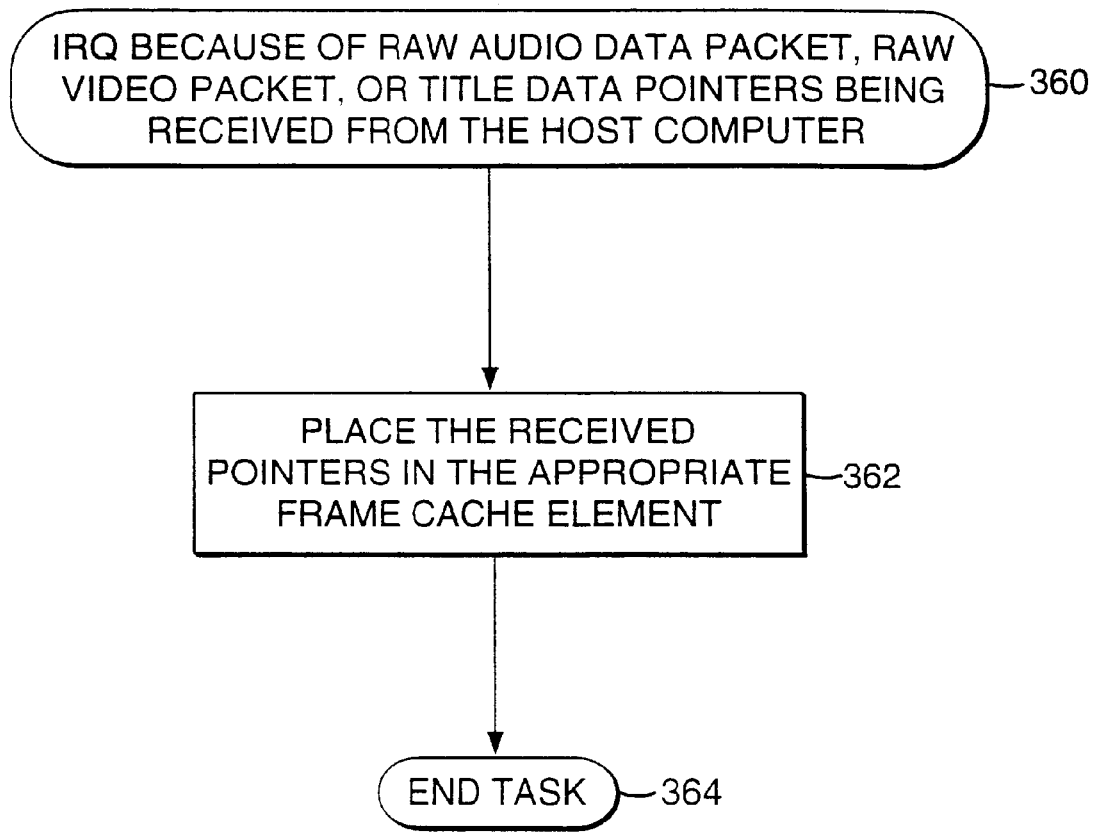

In response to these requests, nonlinear video editing application 18 loads the appropriate audio, video, or title data into memory 22 from storage unit 24 and creates the appropriate raw audio and video data packets. Nonlinear video editing application 18 then sends an interrupt request (IRQ) to the peripheral CPU 30 together with the appropriate frame number. Nonlinear video editing application 18 also sends the pointer to the raw audio packet, raw video packet, or memory address of the title data, as the case may be. Referring to FIG. 3F, the IRQ causes peripheral board CPU to place the received pointer in the appropriate frame cache element (steps 360–364).

Having described the process for loading the video media data for a frame to be played back into memory 22 and maintaining frame cache link list 300, I will now describe the process of nonlinear video editing application 18 providing peripheral board 14 with control information for processing the loaded video media data.

Referring to FIG. 4A, peripheral board CPU 30 maintains a video commit queue 400 and an audio commit queue 410. Each of these commit queues has a predetermined number of queue elements, each being associated with a frame to be played. When a queue element reaches the head of the queue, its associated frame is played back. As each frame is placed in the queue, a request is sent to nonlinear video editing application 18 to supply the appropriate control information for processing the video media data (i.e. audio, video, and graphics or title) for that frame. The time it takes for a frame to move to the head of the queue equals the time it takes to play back the number of frames in the commit queues. In the described embodiment, the time it takes is approximately the play back time for five and a half frames. Since video programs are typically played back at 30 frames per second, this time is approximately 0.2 seconds. This time is selected to equal the maximum time needed to allow peripheral board CPU 30 send a request for the control information for a frame to played back and to allow nonlinear video editing application 18, in response to the request, process the video media data for that frame and deliver the control information "just in time" for the frame to be played back.

FIG. 4A shows the data structure of audio and video commit queues 400, 410. In video commit queue 400, each queue element 402 contains the frame number 404 of the frame to be played, pointers 406 to the processed video data packets in peripheral board memory 32 which will be described below, and a pointer 408 to any associated title data. In audio commit queue 410, each queue element 412 contains the frame number 414 of the frame to be played back and pointers 416 to the processed audio data packets in peripheral memory 32 which will be described below.

Referring 4B, at the end of playing back of a frame, video effects processor 44 (FIG. 1) generates an IRQ (step 422). In response, peripheral board CPU 30 loads the information for the next frame to be played back from the next frame cache element 302 into the audio and video commit queues 410, 400 (step 424). Peripheral board CPU 30 then sends nonlinear editing application 18 a request for the control information for the video media data for the newly added frame (step 416). This request includes the frame number and the pointers, stored in the associated frame cache element 302, for the title data and the raw audio and video packets. Peripheral board 14 then proceeds to play back the next frame and its associated data, which will be described below in reference to FIG. 5.

Figure 4C:
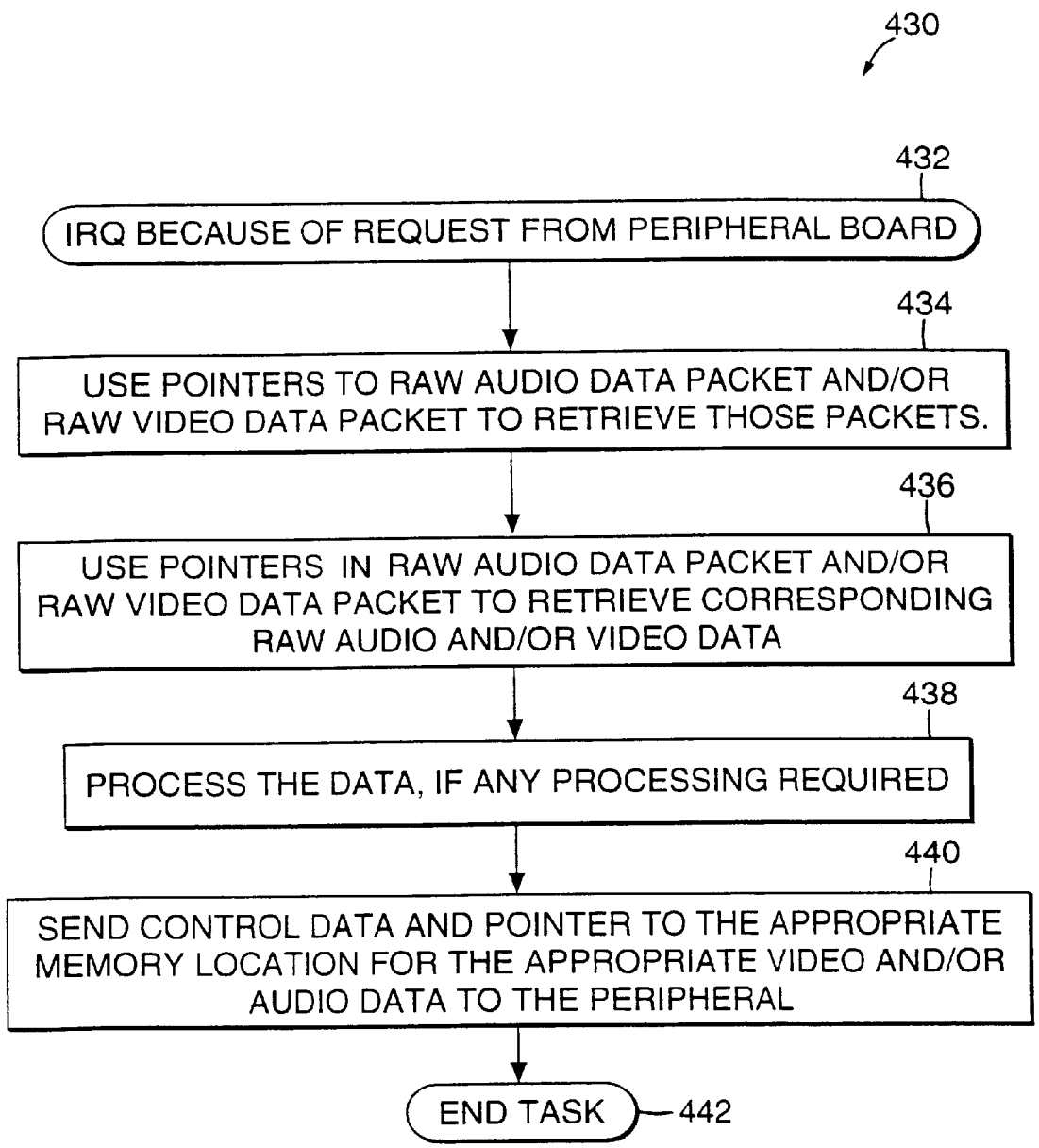

Referring to FIG. 4C, the request from peripheral board CPU 30 for control information causes an IRQ in host processor 20 (step 432). Nonlinear video editing application 18 uses the received pointers to the raw audio and video packets to retrieve the packets (step 434) and uses the address pointers in those packets to identify the appropriate data in host memory 22 (step 436). Nonlinear video editing application 18 then proceeds to process the video and audio data according to the control information determined based on the inputs from the user in the various GUI windows described already. (step 438). Nonlinear video editing application may, for example, perform video effects processing and audio equalization processing, if required by the user. The processed audio and video data are then stored in host memory 22. Nonlinear video editing application 18 then sends the peripheral board the control information for processing to be performed by the peripheral board and the addresses for the location of the processed video and audio data stored in host memory 22 (step 440).

Figure 4D:
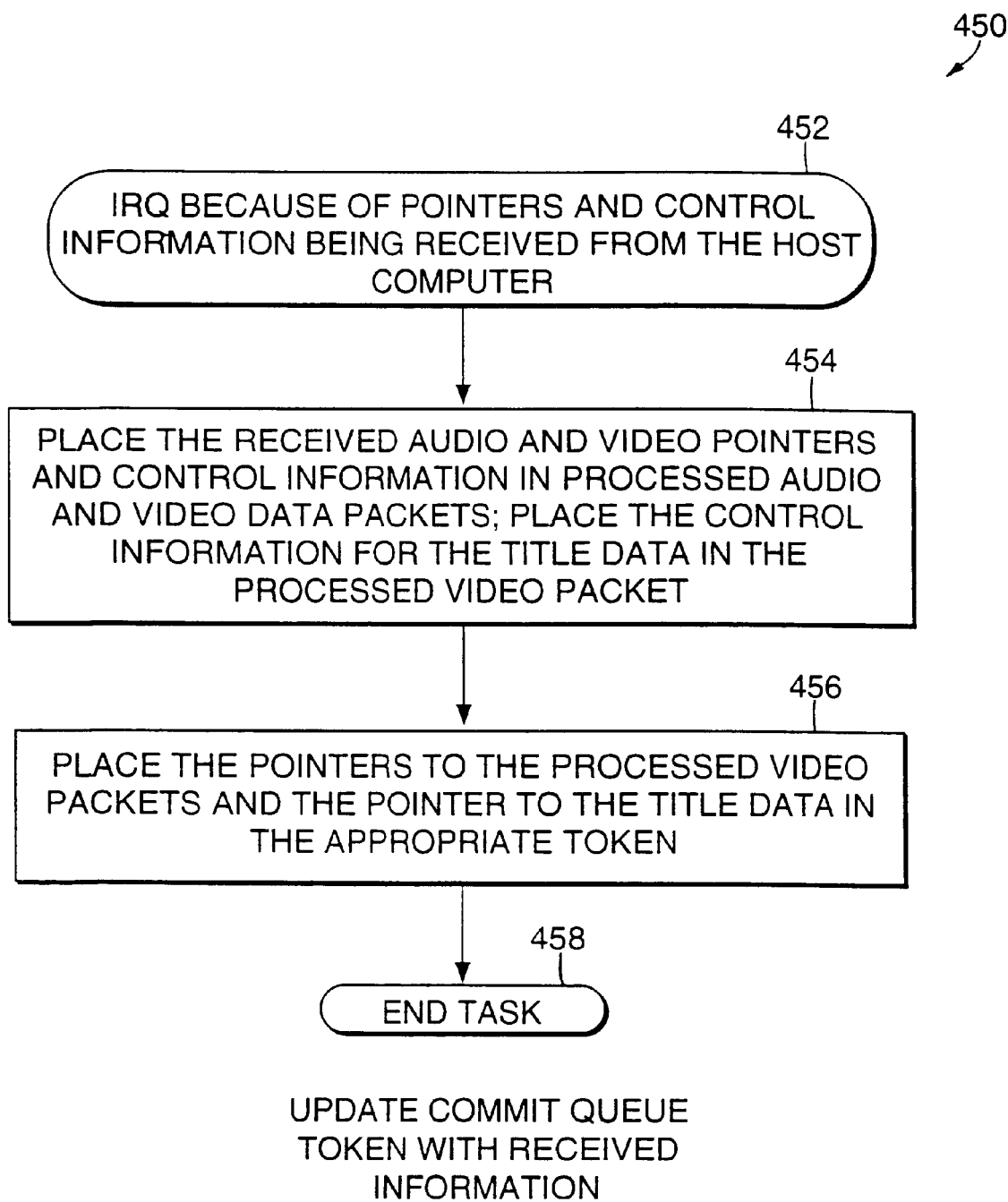

Referring to FIG. 4D, the information sent by nonlinear video editing application 18 causes an IRQ in peripheral board CPU 30 (step 452). In response, peripheral board CPU 30 places the control information and the address of the processed video and audio data in host memory 22 into processed audio and video data packets. The control information for the title is also placed in the processed video data packet (step 454). Peripheral board CPU 30 then updates the appropriate queue elements in the audio and video commit queues with the received control information and pointers to the processed audio and video data packets.

Figure 5:
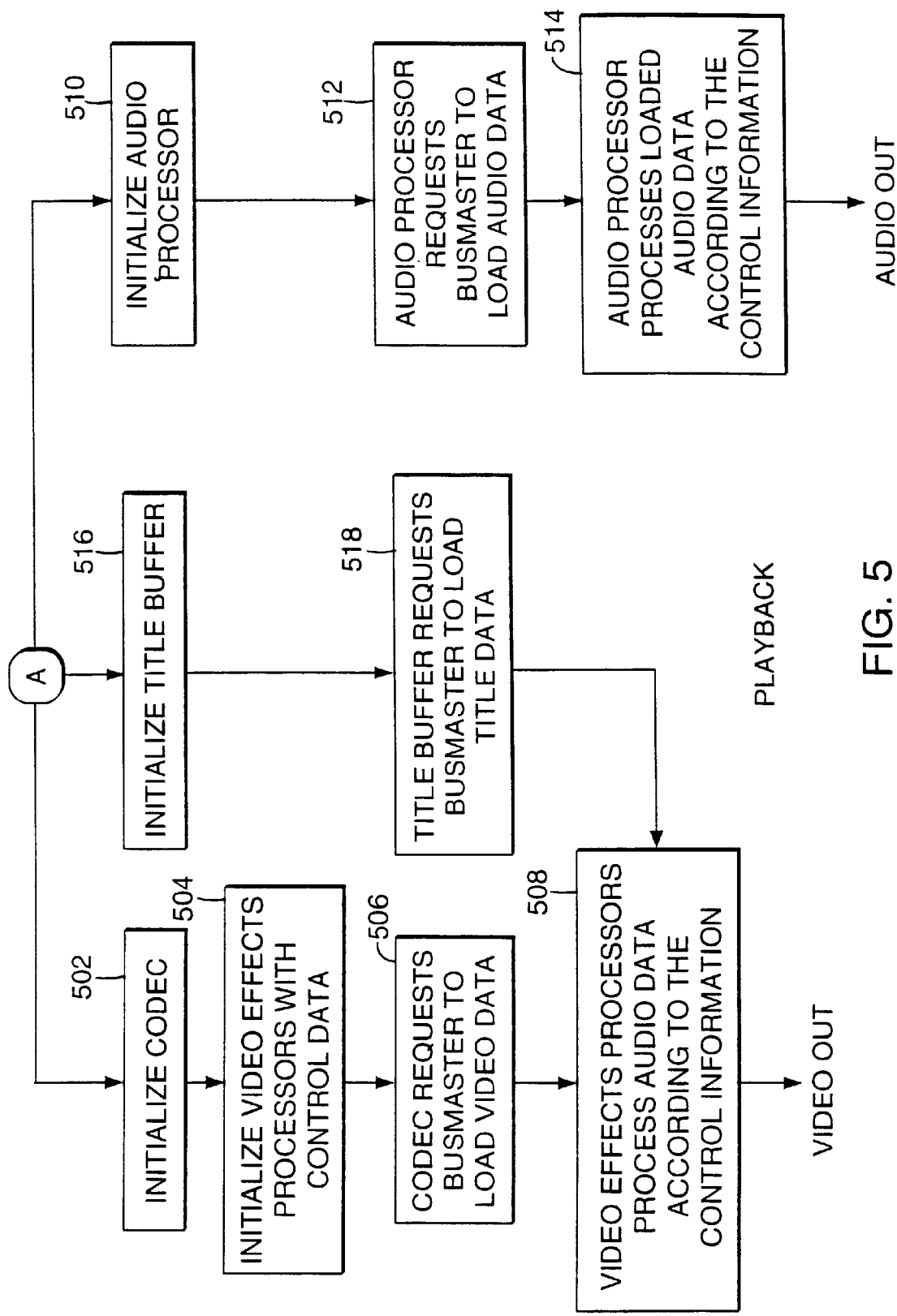
FIG. 5 is a flow chart of the process associated with playing back a video program.

As stated above, this control information is supplied just in time for playing back the frame. Referring to FIG. 5, I will now describe the play back process. As described above, at the end of playing back a frame, peripheral board CPU 30 adds a new frame to the audio and video commits queues 410, 400. Peripheral board CPU 30 then proceeds to initialize codec 42 (step 502), title buffer 60 (step 516), and audio processor 52 (step 510) with the respective address pointers for the processed video, title, and title data. Peripheral board CPU 30 also initializes audio processor 52 with the audio control information (step 510) and video effects processor 44 with the video control information and the title control information (step 504).

Codec 42, title buffer 60, and audio processor 52 then supply busmaster unit 34 with the addresses for the processed video, title and audio data. Codec 42, title buffer 60, and audio processor 52 also request busmaster unit 34 to load the processed video, audio, and title data to the appropriate one of video and audio buffers 40, 50, and 60 (steps 506 and 512, respectively). In some embodiments, the title buffer is initialized and loaded prior to the time when the frame is played back.

Video effects processor 44 then processes the video and title data according to the video control information (step 508) and the video frame is played back. Audio processor 52 at the same time processes the associated audio data according to the audio control information (step 514). The processed data (i.e. the frame of the video program being played back) may then be converted to the appropriate format for play back (e.g. analog video and audio signals).

Other embodiments are within the scope of the following claims.

For example, in some embodiments, the use may select to repeatedly play a frame. In that case, the commit queues are then continually loaded with the data for that frame and the processing proceeds in the same manner as described above. The user can then vary the control information associated with the audio or video portion of the frame, observe the effects of his or her action in real time, and arrive at a desired result.

In the above embodiment, the control information was supplied for an entire frame of data. However, in other embodiments, the control information may, for example, be supplied for a field or a line of video data at a time. Similarly, audio control information may be supplied for a predetermined number of sample, or even a single sample. In this manner, the latency between changing the controls and seeing the effects of the change may be further reduced.

In some embodiments, the video media data may be retrieved from storage 22 and loaded into a memory unit on peripheral board 14, bypassing host computer memory 22.

What is claimed is:

1. A method of playing back sequences of segments of video media data stored on a storage media, each said segment comprising a series of frames of said video media data providing a two-dimensional image that changes in real time during said playing back, said method comprising storing the segments of the video media data, retrieving a segment of the video media data at a predetermined period prior to playback and storing the segment in a temporary storage, said segment comprising a series of frames of said video media data providing a two-dimensional image that changes in real time, subsequently supplying, for processing the segment of the video media data stored in temporary storage, control information correlated with the segment of the video media data stored in temporary storage, the control information specifying the processing of the segment of the video media data stored in temporary storage during playback, and processing the segment of the video media data stored in temporary storage according to the control information to generate processed video for playback.

2. The method of claim 1 further comprising generating or modifying the control information for the segment of the video media data during or after retrieving the segment of the video media data.

3. The method of claim 2 wherein generating or modifying the control information comprises displaying a graphical user interface for a user to generate or modify the control information for the segment of the video media data during or after retrieving the segment of the video media data.

4. The method of claim 1 further comprising generating or modifying the control information for the segment of the video media data prior to retrieving the segment of the video media data.

5. The method of claim 1 wherein the segment is a frame of video.

6. The method of claim 1 wherein the segment is a field of a frame of video.

7. The method of claim 1 wherein processing the segment of the video media data includes performing a video effects operation on the video media data.

8. The method of claim 7 wherein the video effects operation is selected from among a group of video effects operations comprising dissolves, wipes, and digital video effects, color effects, single or multiple overlays, and filters.

9. The method of claim 7 wherein the video effects operation is characterized by an attribute selected from among a group of attributes comprising border width, range, reverse effect, crop, softness, transparency, and border color.

10. The method of claim 1 wherein the storage media is a digital database.

11. The method of claim 10 wherein retrieving the segment of the video media data includes accessing the digital database across a network.

12. The method of claim 1 wherein the storage media is one of a magnetic disk and a CD-ROM drive.

13. The method of claim 1 wherein the segment of the video media data includes audio data.

14. The method of claim 13 wherein the audio data is selected from among a group of audio data types comprising a sample, a selected number of samples, and samples associated with a video frame.

15. The method of claim 13 wherein processing the segment of the video media data includes performing an operation on the audio.

16. The method of claim 15 wherein the operation includes applying an audio filter.

17. The method of claim 16 wherein the audio filter is selected from among a group of audio filters comprising equalization filter, audio compression filter, and sound effects filter.

18. The method of claim 15 wherein the operation includes changing a playback volume of the audio.

19. The method of claim 15 wherein the audio includes two output channels and the operation includes changing the pan balance between the output channels.

20. The method of claim 15 wherein further comprising monitoring a characteristic of the processed video media data and displaying the results of said monitoring.

21. The method of claim 1 wherein the temporary storage is a memory of a computer.

22. The method of claim 1 wherein the temporary storage is a memory of a peripheral board connected to a host computer.

23. The method of claim 1 further comprising playing back the processed video media data.

24. The method of claim 23 further comprising displaying a subsampled image of the processed video when playing back the processed video media data.

25. The method of claim 1 wherein a host computer retrieves the segment of the video media data and a peripheral board connected to the computer processes the segment of the video media data, wherein retrieving the segment of the video media data further includes sending at the predetermined time a request, from the peripheral board to the host computer, for the host computer to retrieve the segment of the video media data.

26. The method of claim 25 further comprising:
maintaining a list of segments of the video data to be played back,
determining which one of the segments of the video media data is to be played back at the predetermined time, and
sending a request, from the peripheral board to the host computer, for the host computer to retrieve said one of the segments of the video media data.

27. The method of claim 1 wherein a host computer retrieves the segment of the video media data and a peripheral board connected to the computer processes the segment of the video media data, further comprising:
subsequent to retrieving the segment of the video media, scheduling the segment of the video media, at a peripheral board, for playback; and
sending a request, from the peripheral board to the host computer, for the control information.

28. The method of claim 27 further comprising processing the segment of the video media data at the host computer prior to processing the segment of the video media data at the peripheral board.

29. The method of claim 27 wherein scheduling the segment of the video media data includes placing a pointer identifying the segment of the video media data on a segment playback queue.

30. A system for playing back sequences of segments of the video media data, each said segment comprising a series of frames of said video media data providing a two-dimensional image that changes in real time during said playing back, said method comprising
a storage media storing the segments of the video media data,
a host computer comprising a temporary storage, and
a video media processor,
the host computer retrieving a segment of the video media data at a predetermined period prior to playback and storing the segment in the temporary storage, said segment comprising a series of frames of said video media data providing a two-dimensional image that changes in real time, and subsequently supplying to the video media processor, for processing the segment of the video media data stored in said temporary storage, control information correlated with the segment of the video media data stored in said temporary storage, the control information specifying the processing of the segment of the video media data stored in said temporary storage during playback, and
the video media processor processing the segment of video data according to the control information to generate processed video for playback.

31. The system of claim 30 wherein the host computer generates or modifies the control information for the segment of the video media data during or after retrieving the segment of the video media data.

32. The system of claim 31 further comprising a display for displaying a graphical user interface for a user to cause the host computer to generate or modify the control information for the segment of the video media data during or after retrieving the segment of the video media data.

33. The system of claim 30 wherein the host computer generates or modifies the control information for the segment of the video media data prior to retrieving the segment of the video media data.

34. The system of claim 30 wherein the segment is a frame of video.

35. The system of claim 30 wherein the segment is a field of a frame of video.

36. The system of claim 30 wherein the video media processor includes a video effects processor for performing a video effects operation on the video media data.

37. The system of claim 36 wherein the video effects operation is selected from among a group of video effects operations comprising dissolves, wipes, and digital video effects, color effects, single or multiple overlays, and filters.

38. The system of claim 37 wherein the video effects operation is characterized by an attribute selected from among a group of attributes comprising border width, range, reverse effect, crop, softness, transparency, and border color.

39. The system of claim 30 wherein the storage media is a digital database.

40. The method of claim 39 wherein retrieving the segment of the video media data includes accessing the digital database across a network.

41. The system of claim 30 wherein the storage media is one of a magnetic disk and a CD-ROM drive.

42. The system of claim 30 wherein the segment of the video media data includes audio data.

43. The system of claim 42 wherein the audio data is selected from among a group of audio data types comprising a sample, a selected number of samples, and samples associated with a video frame.

44. The system of claim 43 wherein the video media processor includes an audio processor for performing an operation on the audio.

45. The system of claim 44 wherein the operation includes the operation includes applying an audio filter.

46. The system of claim 44 wherein the audio filter is selected from among a group of audio filters comprising equalization filter, audio compression filter, and sound effects filter.

47. The system of claim 44 wherein the operation includes changing a playback volume of the audio.

48. The system of claim 44 wherein the audio includes two output channels and the operation includes changing the pan balance between the output channels.

49. The system of claim 44 further comprising a display, wherein the peripheral board monitors a characteristic of the processed video media data and the host computer displays the results of said monitoring on the display.

50. The system of claim 30 wherein the temporary storage is the memory of the host computer.

51. The system of claim 30 wherein the temporary storage is the memory of the peripheral board.

52. The system of claim 30 further comprising circuit for playing back the processed video media data.

53. The system of claim 52 further comprising a display for displaying a subsampled image of the processed video when playing back the processed video media data.

54. The system of claim 30 further comprising a peripheral board connected to the host computer and including the video media processor, wherein the peripheral board sends, at the predetermined time a request, to the host computer and, in response to the request, the host computer retrieves the segment of the video media data.

55. The system of claim 54 wherein the peripheral board maintains a list of segments of the video data to be played back, determines from the list which one of the segments of the video media data is to be played back at the predetermined time, and sends a request to the host computer for the host computer to retrieve said one of the segments of the video media data.

56. The system of claim 30 further comprising a peripheral board connected to the host computer and including the video media processor, wherein the peripheral board, subsequent to the host computer retrieving the segment of the video media, schedules the segment of the video media for playback and sends a request to the host computer for the control information.

57. The system of claim 56 wherein the host computer processes the segment of the video media data prior to the video media processor processing the segment of the video media data.

58. The system of claim 56 the peripheral board schedules the segment of the video media data by placing a pointer identifying the segment of the video media data on a segment playback queue.

* * * * *